(12) United States Patent
Mikacich

(10) Patent No.: US 11,744,433 B2
(45) Date of Patent: Sep. 5, 2023

(54) BUCKET MOUNTABLE HANGER

(71) Applicant: Coburn Mikacich, Orlando, FL (US)

(72) Inventor: Coburn Mikacich, Orlando, FL (US)

(*) Notice: Subject to any disclaimer, the term of this patent is extended or adjusted under 35 U.S.C. 154(b) by 413 days.

(21) Appl. No.: 16/821,239

(22) Filed: Mar. 17, 2020

(65) Prior Publication Data
US 2021/0290030 A1 Sep. 23, 2021

(51) Int. Cl.
A47L 13/51 (2006.01)
D06F 57/12 (2006.01)
B60S 3/04 (2006.01)

(52) U.S. Cl.
CPC ............. *A47L 13/51* (2013.01); *B60S 3/045* (2013.01); *D06F 57/12* (2013.01)

(58) Field of Classification Search
CPC ........ A47L 13/51; A47L 13/50; A47L 9/0009; A47L 13/512; A47L 13/58; B62B 3/005; B62B 3/02; B62B 3/10; B62B 5/067; B60S 3/045; D06F 57/12; G09F 7/18; B65D 25/2829; B65D 25/2832; B65D 90/125; B44D 3/123; B44D 3/00; E06C 7/143; A46B 17/02
USPC ............... 220/735, 769, 697, 737, 294, 756; 224/270, 678, 197, 272; 248/912, 424; 211/113; 280/47.35, 79.5
See application file for complete search history.

(56) References Cited

U.S. PATENT DOCUMENTS

| 3,980,264 A | * | 9/1976 | Tomasik | E06C 7/14 248/912 |
| 4,025,206 A | * | 5/1977 | Rubin | B44D 3/123 401/123 |
| 4,475,660 A | | 10/1984 | Cain | |
| 4,765,472 A | | 8/1988 | Mickey | |
| 6,929,225 B1 | * | 8/2005 | Kent | B44D 3/123 248/312.1 |
| 7,240,910 B2 | * | 7/2007 | Stuemke | B62B 5/06 280/79.5 |
| 7,878,364 B1 | * | 2/2011 | Anderson | A47L 13/512 220/676 |
| 2009/0146022 A1 | * | 6/2009 | Paga, Jr. | B44D 3/123 220/736 |
| 2013/0299436 A1 | * | 11/2013 | Krusoe | B44D 3/126 294/159 |

FOREIGN PATENT DOCUMENTS

| CN | 203974339 U | * | 12/2014 |
| CN | 204889904 U | | 12/2015 |
| CN | 109528115 A | | 3/2019 |

* cited by examiner

Primary Examiner — Jennifer Robertson
Assistant Examiner — John Martin Hoppmann
(74) Attorney, Agent, or Firm — Mark Young, PA

(57) ABSTRACT

A hanger assembly for hanging wash mitts, rags and the like above a bucket includes a top subassembly with a mast and spaced apart arms extending radially from the mast. A bottom subassembly includes a bucket engaging structure and a shaft, to which the mast of the top subassembly is coupled (e.g., rotatably coupled). The bucket engaging structure of the bottom subassembly may include in one embodiment a plate, a tail and a pair of legs for engaging the sidewall of the bucket, or in another embodiment a ring or disc that sits on the bottom of the bucket.

20 Claims, 11 Drawing Sheets

BUCKET MOUNTABLE HANGER

FIELD OF THE INVENTION

This invention relates generally to buckets, and, more particularly, to a hanger assembly that removably attaches to a bucket and provides arms for hanging wash rags, mitts and the like.

BACKGROUND

Many people use a regular jumbo sponge to wash their car. Initially, there may not seem to be any problem with this. Indeed, a sponge can effectively clean a car, but at the same time it will inflict damage to the surface of the paintwork. The damage will consist of a mass of light scratches and swirl marks. When washing a car, even if a thorough pre-foam and rinse has been undertaken, there will always be tiny particles of dirt still present. Although porous to allow for the absorption of water, the general face of a sponge is flat. The face of the sponge traps small particles between the sponge and the paintwork. The trapped particles are then drawn over the surface, producing fine scratches and swirl marks.

A safer alternative to a sponge is a lambswool, a micro fiber or plush synthetic wash mitt or rag. These wash mitts or rags are made from long fibrous materials which draw in and hold water just as well as a sponge, but they also draw in and trap any loose particles of dirt at the base of the mitt and safely away from the surface of the paintwork. The materials are much softer than a sponge. As they are mitts or rags they fit over the hand like a glove which gives more control during washing and eliminates the risk of dropping it on the floor. Sponges frequently fall to the floor.

At times, the mitt or rag must be stored. For example, while rinsing soap off a vehicle, the rag or mitt is typically stored. Storing the mitt or rag on the edge of a bucket typically fails. The mitt or rag may fall onto the ground where it will pickup sediment. Alternatively, the mitt or rag may fall into the bucket, where it may sink to the bottom. The bottom of the bucket is where the heaviest sediments settle out of the water. The mitt or rag will then trap sediments when it is accidentally dragged across the bottom of the bucket during removal.

A device for safely storing a mitt or rag for car washing is needed. The device should be easy to use, reliable and cost effective. The device should work with existing car washing buckets.

The invention is directed to overcoming one or more of the problems and solving one or more of the needs as set forth above.

SUMMARY OF THE INVENTION

To solve one or more of the problems set forth above, in an exemplary implementation of the invention, a hanger assembly for a bucket includes a top subassembly and a bottom subassembly. The top subassembly includes a mast and at least one arm (e.g., an upper arm and a spaced apart lower arm) extending radially (laterally) from the mast. The bottom subassembly includes a bucket engaging structure and a shaft. The shaft extends upwardly from the bucket engaging structure. The mast of the top subassembly is coupled to the shaft.

In one embodiment, the mast of the top subassembly is rotatably coupled to the shaft. By way of example, the mast may include a bottom portion with a sleeve, which receives the shaft.

In one embodiment, the bucket engaging structure of the bottom subassembly includes a plate, a tail and a pair of legs. The plate includes a first end and an opposite second end. The pair of legs include a first leg and a second leg. The first leg extends downwardly from about (i.e., at or in close proximity to) the first end of the plate. The second leg extends downwardly from about the second end of the plate. The tail extends downwardly between the first leg and the second leg. The shaft of the bottom subassembly extends upwardly from the plate above the tail. Each of the first leg and the second leg may have a free end. A first foot may be attached to the first leg and extend laterally from the free end of the first leg. A second foot may be attached to the second leg and extend laterally from the free end of the second leg. Additionally, each of the first leg and the second leg may have a free end, and a groove formed in the leg adjacent to the free end of the leg. A continuous elastic band may secure the feet and legs to a bucket. The elastic band wraps around the legs and bucket with portions of the elastic band being received in the groove of each leg.

In another embodiment, the bucket engaging structure of the bottom subassembly includes a ring or disc, sized and shaped to fit in the bucket and overlay a substantial portion of the bottom of the bucket near the sidewall of the bucket.

In use, the hanger assembly is installed on a bucket with the mast extending upwardly. The arms extend laterally at a height above the open top of the bucket. In one embodiment, the bucket engaging structure of the bottom subassembly includes a plate, a tail and a pair of legs, the plate including a first end and an opposite second end, the pair of legs including a first leg and a second leg, the first leg extending downwardly from about the first end of the plate, the second leg extending downwardly from about the second end of the plate, the tail extending downwardly between the first leg and the second leg, the tail of a bucket engaging structure abuts the inner side of the sidewall of the bucket, while the first leg and the second leg abut the outer side of the sidewall of the bucket, and the plate overlays a portion of the top edge of the sidewall of the bucket; and the shaft of the bottom subassembly extends upwardly from the plate above the tail.

In another embodiment, the bucket engaging structure of the bottom subassembly includes a ring or disc that fits in the bottom of the bucket and provides a stable base to support the mast.

BRIEF DESCRIPTION OF THE DRAWINGS

The foregoing and other aspects, objects, features and advantages of the invention will become better understood with reference to the following description, appended claims, and accompanying drawings, where:

Figure 1:
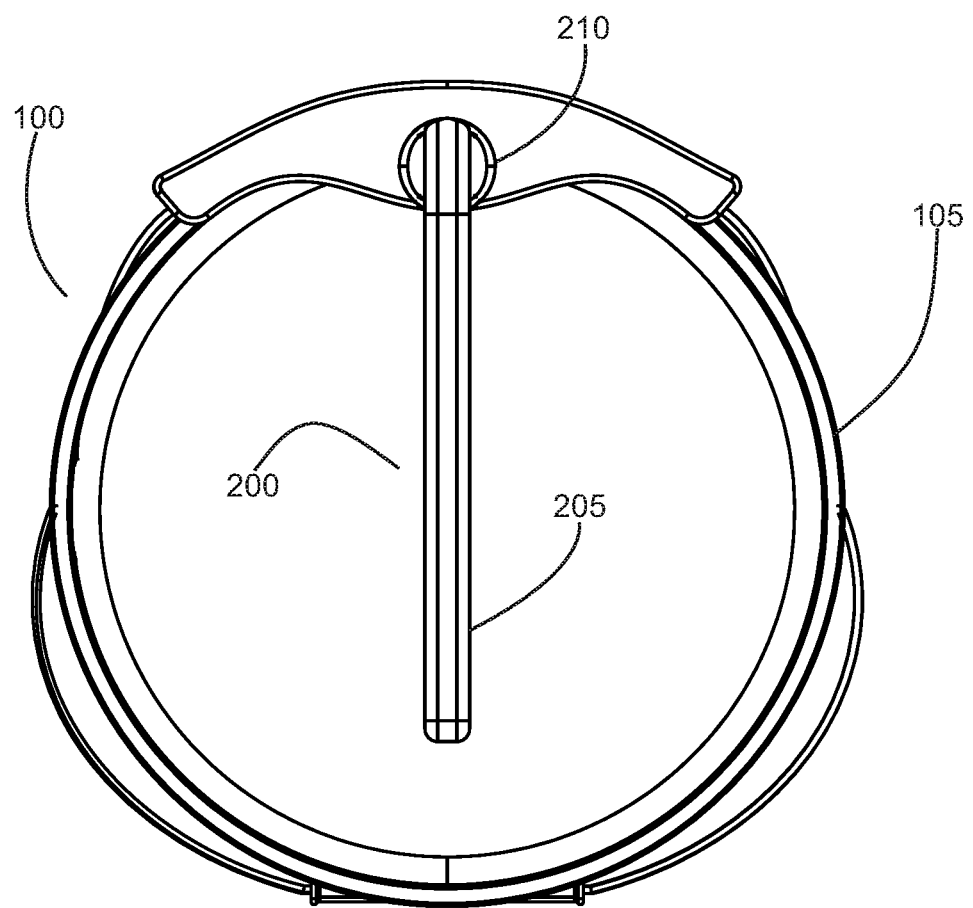
FIG. 1 is a plan view of an exemplary hanger assembly mounted onto a bucket according to principles of the invention.
Figure 2:
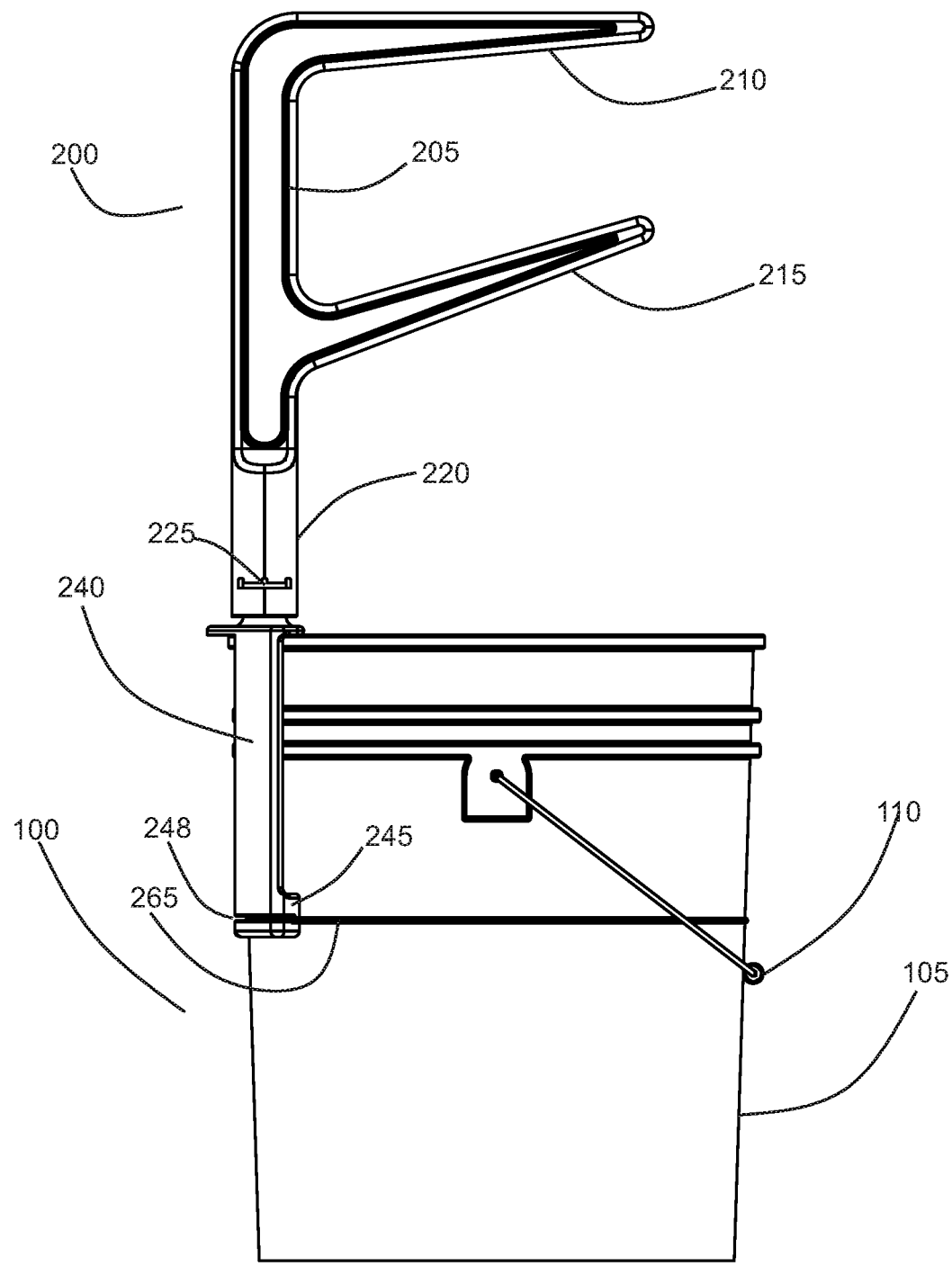
FIG. 2 is a profile view of an exemplary hanger assembly mounted onto a bucket according to principles of the invention.
Figure 3:
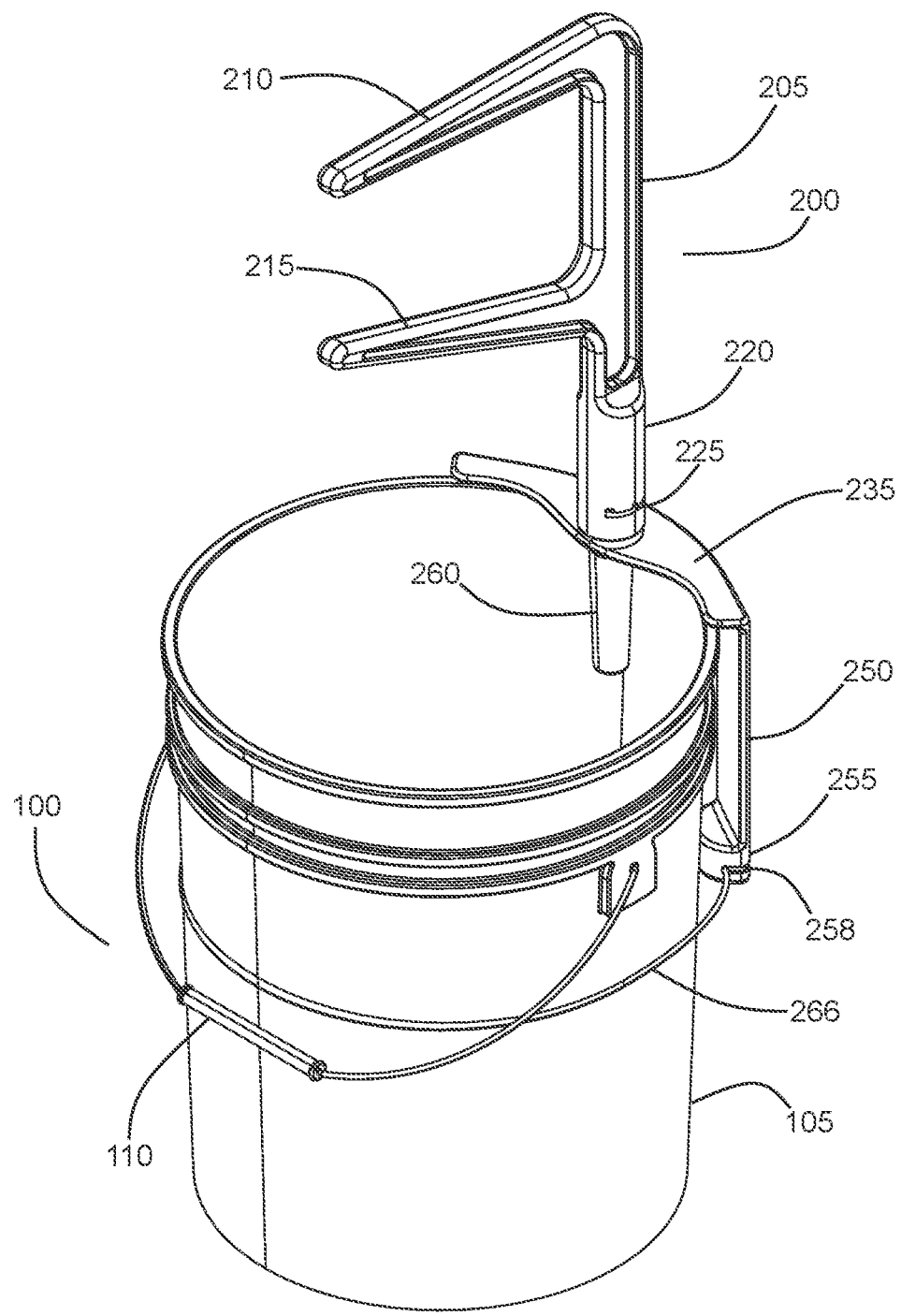
FIG. 3 is a first perspective view of an exemplary hanger assembly mounted onto a bucket according to principles of the invention.
Figure 4:
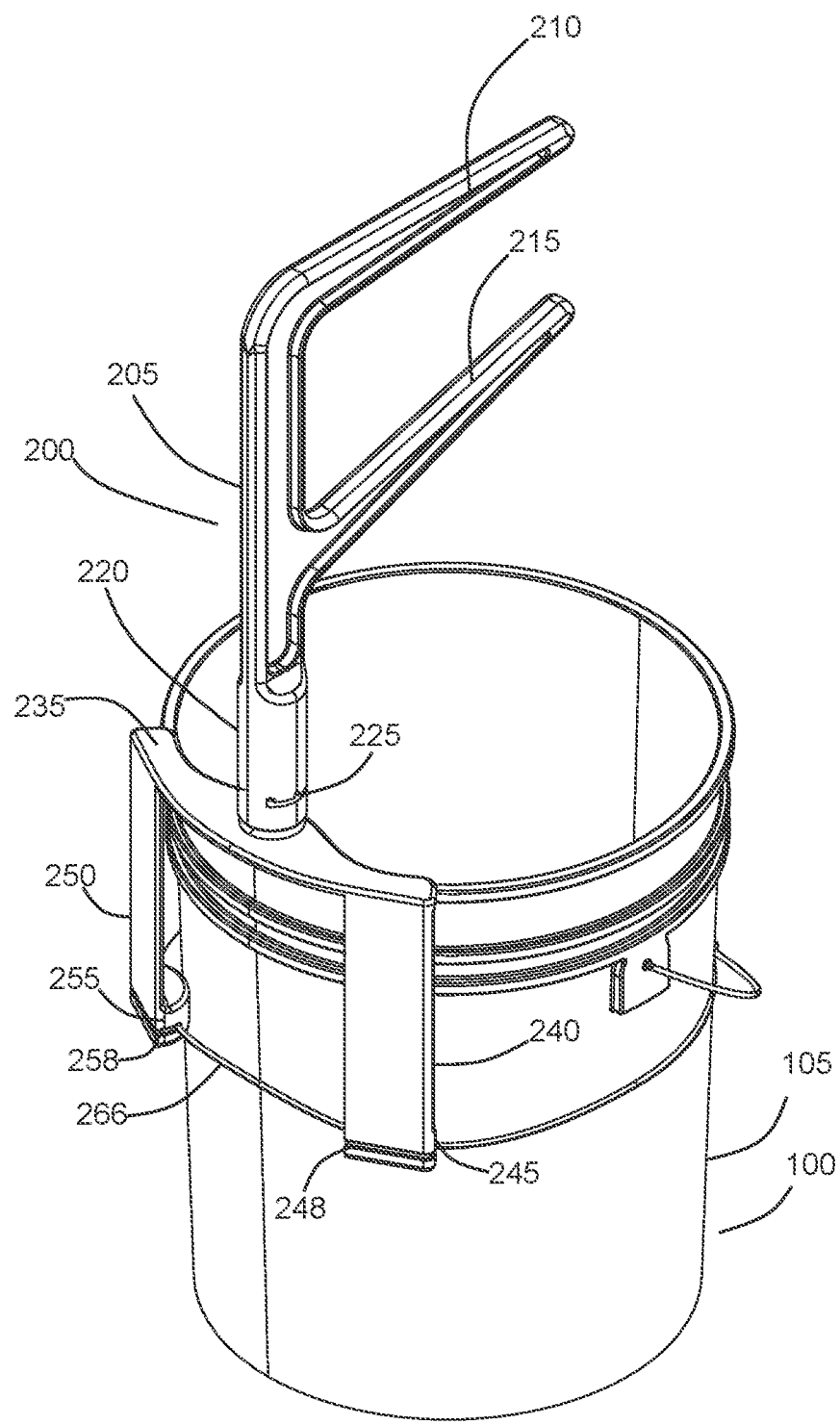
FIG. 4 is a second perspective view of an exemplary hanger assembly mounted onto a bucket according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

With reference to FIGS. 1-5, a hanger assembly 200 according to principles of the invention provides at least one arm 210, 215 over the open-top of a bucket 100. Each arm 210, 215 may support a wash mitt, towel, chamois, wash rag or the like.

The bucket 100 is an open-top container. The exemplary bucket 100 includes a circular cross-section shaped sidewall 105 (i.e., wall). However, the bucket 100 is not limited to a container with a circular cross-section shaped sidewall. The diameter of the sidewall 105 decreases from the top edge to the bottom of the bucket 100. This decrease in diameter provides a draft angle that facilitates manufacturing and nested stacking of buckets. The hanger assembly 100 may be adapted to fit buckets of other shapes, without departing from the scope of the invention. The bucket may include a handle 110.

Figure 8:
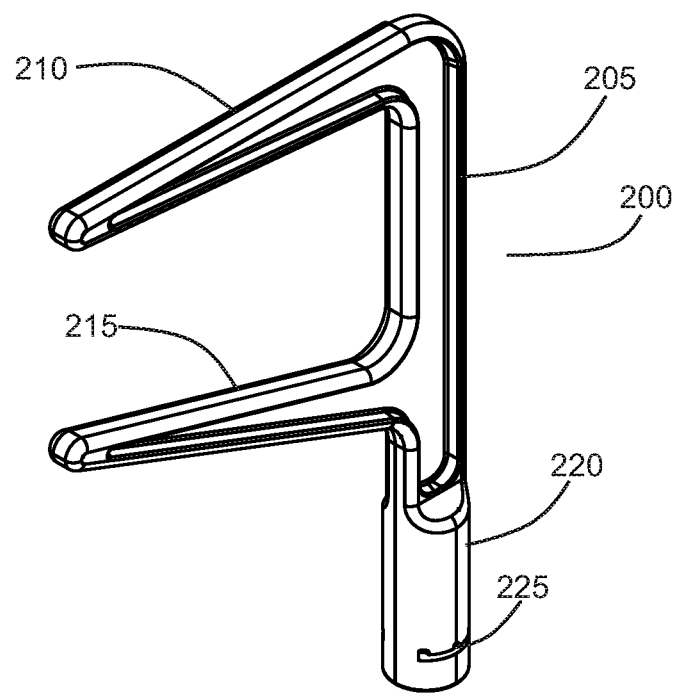
FIG. 8 is a perspective view of top portion of an exemplary hanger assembly according to principles of the invention.

With reference to FIG. 8, the hanger assembly 200 includes a mast 205. The mast 205 is a vertical support from which arms 210, 215 extend outwardly over the open-top of a bucket. The bottom of the mast 205 includes a sleeve 220 for mounting. The arms 210, 215 are spaced apart.

The exemplary embodiments shown in the Figures include two arms. Arm 215 is a lower arm. Arm 210 is an upper arm. Each arm 210, 215 includes a free end and an end attached to the mast 205. The free end of each arm 210, 215 is preferably the same elevation or higher than the attached end of each arm 210, 215, when the assembly 200 is installed on a bucket 100 on substantially level ground. Thus, each arm 210, 215 may be perpendicular or oblique in relation to the mast 205.

The bottom end of the mast 205 includes a sleeve 220. The sleeve 220 is a hollow structure with a cylindrical bore or cavity defining an interior space. A shaft 265 is sized and shaped to be received in the interior space of the sleeve 220. In an exemplary embodiment, the mast 205 may pivot relative to the shaft 265.

A slot 225 may be provided in sleeve 220 to secure the shaft 265 in the sleeve 220 and to define a range of motion. A pin or protuberance may extend from the shaft 265 into the slot 225. Thus, pivoting rotation and removal of the shaft 265 may be limited by the slot 225. The interior space of the sleeve 220 may include a keyway to allow passage of the pin or protuberance.

Figure 6:
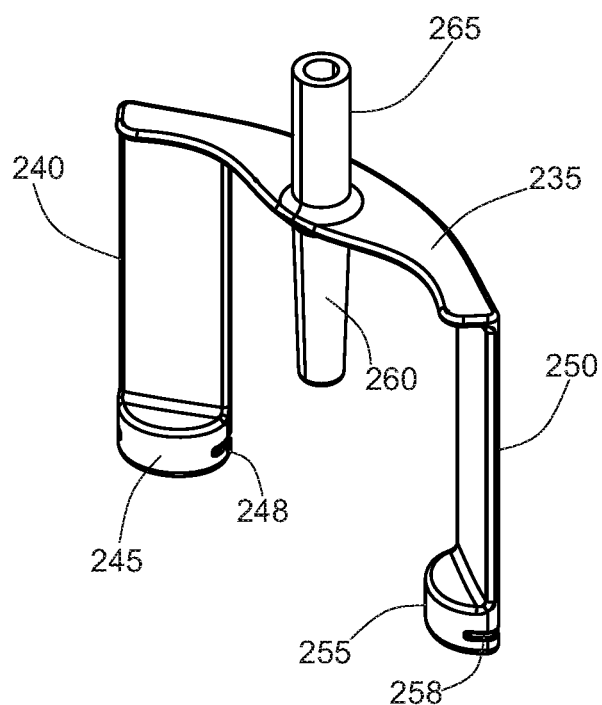
FIG. 6 is a first perspective view of bottom portion of an exemplary hanger assembly according to principles of the invention.
Figure 7:
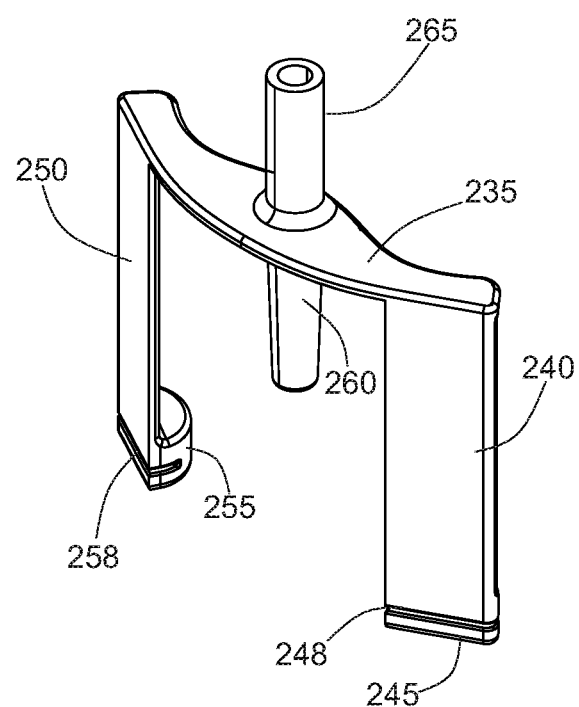
FIG. 7 is a second perspective view of bottom portion of an exemplary hanger assembly according to principles of the invention.

FIGS. 6 and 7 illustrate a bottom portion of the assembly. A plate 235 provides a structure that rests on the top edge of a bucket 100 when the the hanger assembly 200 is installed. The plate 235 may be shaped to overlay a substantial portion of the top edge of the bucket 100. By way of example and not limitation, the plate 235 may overlay ⅙th to ⅓rd (+/−10%) of the total top edge of the bucket 100, comprising a circular arc that subtends an angle of 60 to 120 degrees. In a particular exemplary embodiment, the plate 235 overlays approximately (+/−10%) ¼th of the total top edge of the bucket, comprising a circular arc that subtends an angle of about 90 degrees (+/−10%). The plate does not have to be planar or thin. Other structures that may rest on top of the top edge of a bucket 100 and provide a base from which legs 240, 250, a shaft 265 and a tail 260 may extend may be used and comes within the scope of a "plate" as used herein.

A shaft 265 extends upwardly from the plate 235. The shaft 265 is positioned at the middle of the plate 235, between the legs 240, and above the tail 260. The shaft 265 is positioned towards the side of the plate 235 facing the interior of the bucket 100 (i.e., the inner side of the plate). The shaft 265 may be integrally formed with the plate 235. Alternatively, the shaft 265 may be a separate component that is attached to the plate 235 by ultrasonic welding, bonding, mechanical fasteners or snap-fit couplings.

In another embodiment, the shaft 265 is attached to the tail 260. A circular aperture is formed in the plate 235. The tail 260, which is tapered, fits through the circular aperture because the maximum outer diameter of the tail 260 is less than the diameter of the circular aperture. However, in this embodiment, the diameter of the shaft 265 is slightly larger than the diameter of the circular aperture. Thus, the shaft 265 cannot extend through the circular aperture.

The exemplary tail 260 has a frustoconical (frustum) shape. The tail 260 extends downwardly from the plate 235. The tapering of the tail 260 accommodates the draft angle of the sidewall 105 of the bucket 100. Other elongate structures, such as a shaft, tube or tang extending downwardly from the plate 235 at an angle that accommodates the draft angle of the bucket 100 may be used in lieu of the frustoconical tail 260.

A pair of legs 240, 250, extend downwardly from the plate 235. One leg 240 extends downwardly from one end of the plate 235. The other leg 250 extends downwardly from the opposite end of the plate 235. Each leg 240, 250 extends downwardly from the outer side of the plate 235 (i.e., the side of the plate facing the exterior of the bucket 100).

Each leg 240, 250 includes a foot 245, 255. In the exemplary hanger assembly 100, each foot 245, 255 is located at the bottom free end of each leg 240, 250. Each foot 245, 255 is a spacer. Each foot 245, 255 extends from the leg 240, 250 inwardly (i.e., towards the inner side of the bucket, but on the outer side of the bucket). The exemplary feet 245, 255 have a semicircular cross-section shape. However, other shapes may be used within the scope of the invention. The feet 245, 255 abut the outer side of the wall 105 of the bucket 100, when the assembly 100 is installed on the bucket 100.

A groove 248, 258 (e.g., a depression, slot, channel or kerf) is formed in the outer side of each leg 240, 250. Each groove 248, 258 is formed on the side of the leg 240, 250 that is opposite the side from which the foot 245, 255 extends.

A band 266 extends through the grooves 248, 258, and secures the feet 245, 255 to the wall 105 of the bucket 100. In an exemplary embodiment the band 266 is an elastic band. However, a belt, rope, string or the like may be used in lieu of an elastic band.

Figure 5:
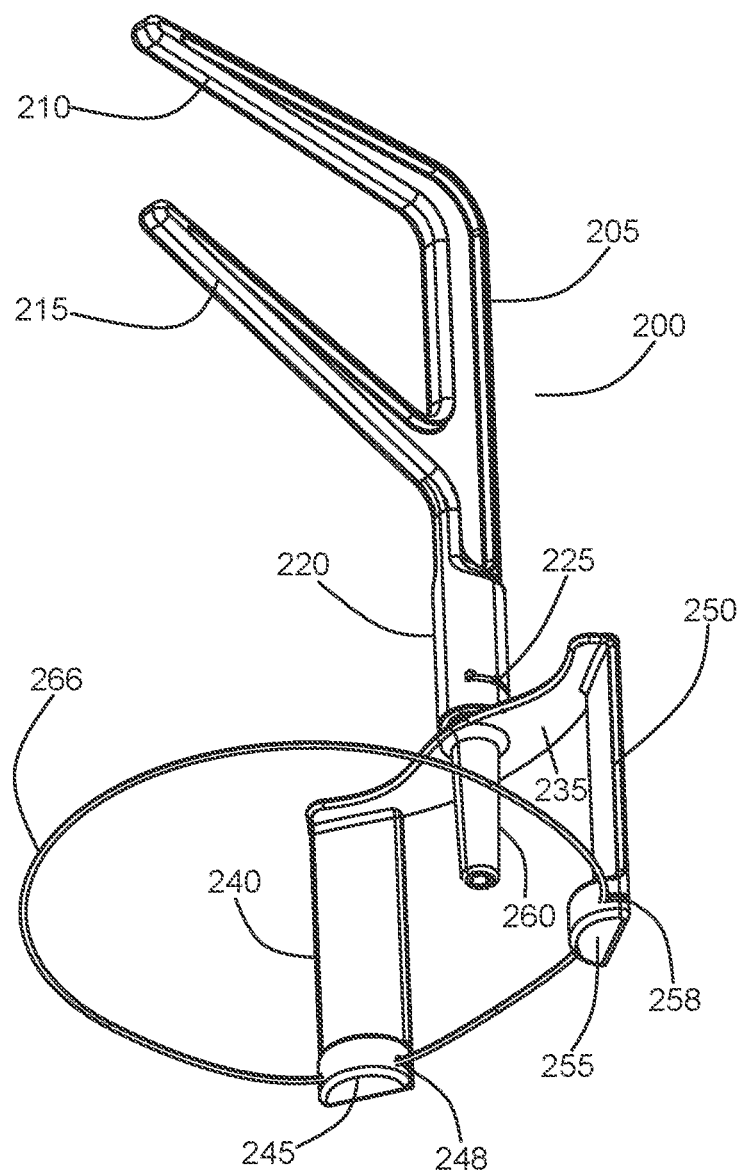
FIG. 5 is a perspective view of an exemplary hanger assembly without a bucket according to principles of the invention.

When installed, as shown in FIGS. 1-4, the band secures, fastens or cinches the feet 245, 255 to the outer side of the wall 105 of the bucket 100, while the tail 260 extends downwardly into the open top of the bucket 100 against the inner side of the wall 105 of the bucket 100. FIG. 5 shows the assembly 200 without the bucket 100. The tail 260, legs 240, 250, feet 245, 255 and band 266 secure the assembly 200 in place on the bucket 100, with the plate 235 on the top edge of the wall 105 of the bucket 100. The mast 205 with the sleeve 220 and the arms 210, 215 extending therefrom may pivot about the shaft 265. In this embodiment, the bottom subassembly, including the plate 235, tail 260, and legs 240, 250, straddle a sidewall 105 of the bucket 100, with the legs 240, 250 on the side of the wall 105 (e.g., outer side) that is opposite to the side (e.g., inner side of the sidewall 105) of the tail 260.

Figure 9:
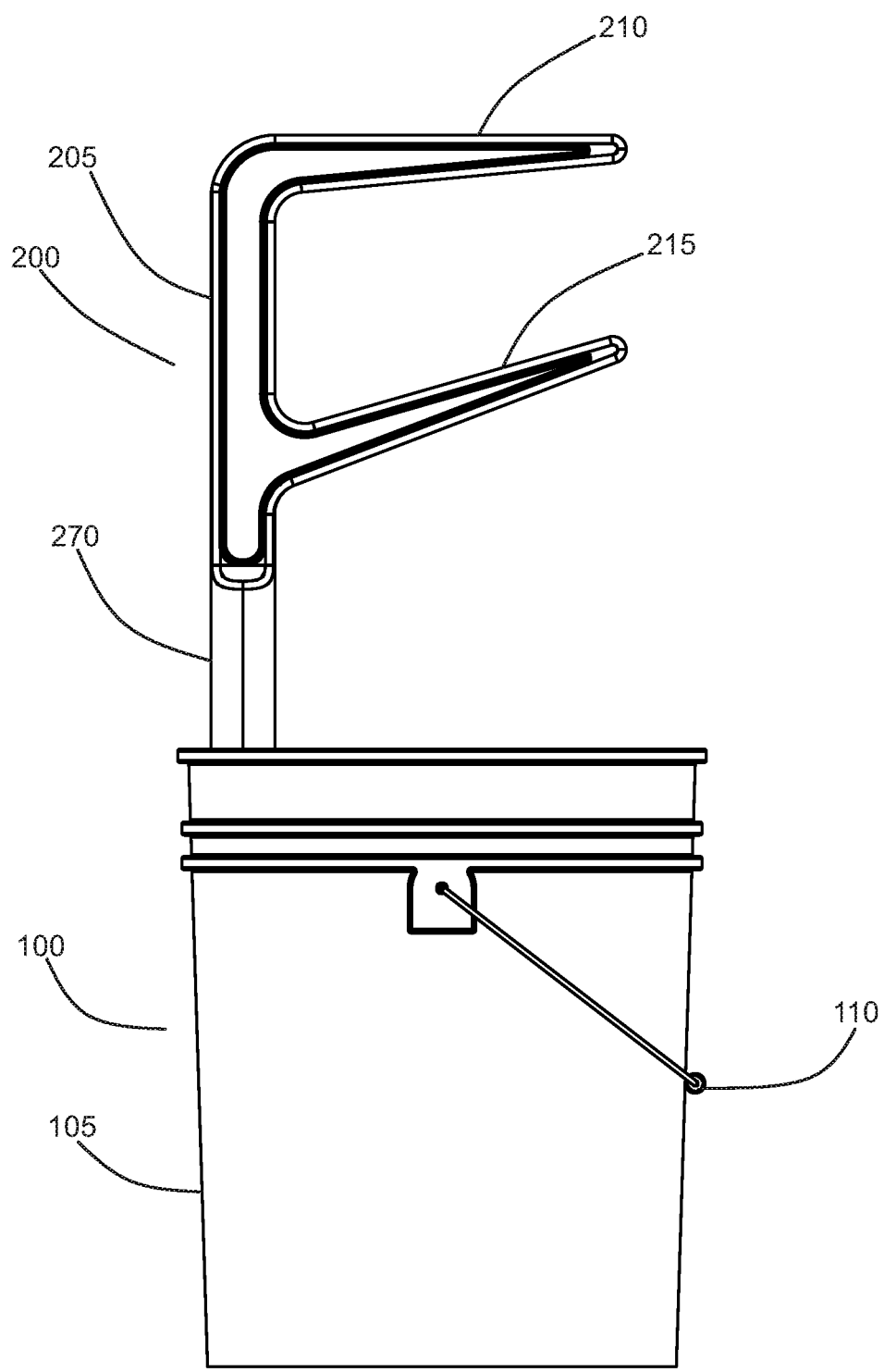
FIG. 9 is a profile view of another exemplary hanger assembly mounted in a bucket according to principles of the invention.
Figure 10:
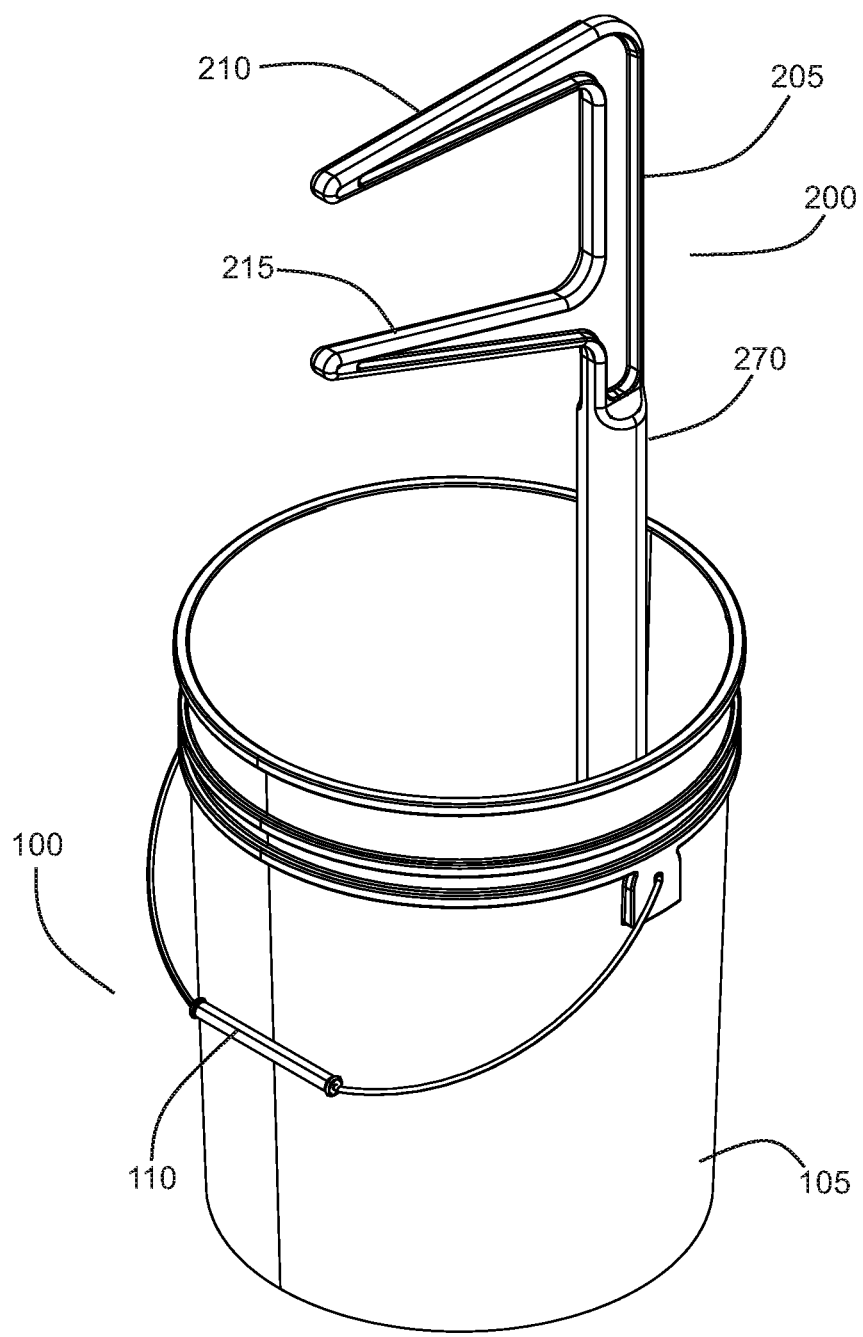
FIG. 10 is a perspective view of the exemplary hanger assembly of FIG. 9 according to principles of the invention.
Figure 11:
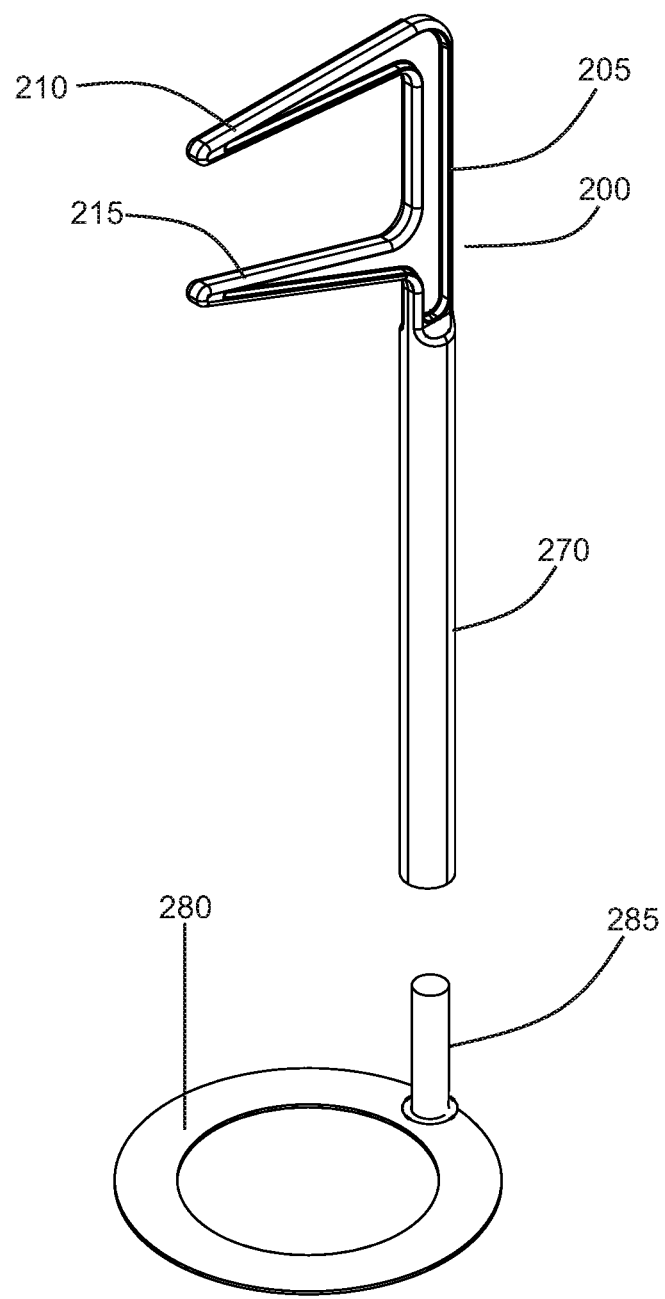
FIG. 11 is an exploded perspective view of the exemplary hanger assembly of FIG. 9 according to principles of the invention.

An alternative embodiment, as conceptually illustrated in FIGS. 9-11, includes an elongated mast 205 with a bottom portion 270 having a length that exceeds the height of the bucket 100. As with the embodiment illustrated in FIGS. 1-8, the bottom 270 of the mast 205 is a sleeve, i.e., a hollow structure with a cylindrical bore or cavity defining an interior space. A shaft 285 is sized and shaped to be received in the interior space of the sleeve of the bottom portion 270 of the mast 205. In an exemplary embodiment, the mast 205 may pivot relative to the shaft 285.

The shaft 285 extends upwardly from a base 280. The shaft 285 may be integrally formed with the base 280. Alternatively, the shaft 285 may be a separate component that is attached to the base 280 by ultrasonic welding, bonding, mechanical fasteners or snap-fit couplings.

The base 280 is sized and shaped to fit in the bucket 100 and rest at the bottom of the bucket 100. In an exemplary embodiment, the base 280 is shaped and sized to fit snugly in the bottom of the bucket, with spaces between the outer periphery of the base 280 and the interior side of the wall 105 of the bucket 100 being less than an inch, preferably less than a ½-inch, and more preferably ¼-inch or less, and even more preferably ⅛-inch or less.

In the exemplary embodiment, the base 280 is ring shaped for a circular bucket. A disc-shaped base may be used in lieu of a ring-shaped base 280. The disc may be solid or perforated. The ring or disc has an outer diameter that is about the same as the inner diameter of the bucket. For a rectangular bucket, the base may have a rectangular shape, as a ring or a panel, solid or perforated. In yet another embodiment, the base 280 may be cross-shaped, star-shaped or irregularly shaped. The base may be configured to fit buckets having shapes other than circular or rectangular, such as, by way of example and not limitation, oval shapes. In each case, the bottom subassembly overlays the bottom of the bucket.

As with the embodiment of FIGS. 1-8, the embodiment of FIGS. 9-11 includes two arms. Arm 215 is a lower arm. Arm 210 is an upper arm. Each arm 210, 215 includes a free end and an end attached to the mast 205. The free end of each arm 210, 215 is preferably the same elevation or higher than the attached end of each arm 210, 215, when the assembly 200 is installed on a bucket 100 on substantially level ground. Thus, each arm 210, 215 may be perpendicular or oblique in relation to the mast 205.

In sum, a first exemplary hanger assembly includes a top subassembly as conceptually illustrated in FIG. 8 rotatably coupled to a bottom subassembly as conceptually illustrated in FIGS. 6 and 7. A second exemplary hanger assembly includes a top subassembly (mast 205, 270 and arms 210, 215) as conceptually illustrated at the top of FIG. 11 rotatably coupled to a bottom subassembly (base 280 and shaft 285) as conceptually illustrated at the bottom of FIG. 11.

The hanger assembly 200 may be comprised of any material that exhibits sufficient rigidity and strength to support wash mitts, rags and the like. By way of example and not limitation, the hanger assembly 200 may be comprised of metal such as steel, stainless steel, aluminum, an alloy or some other metal, which may be coated (e.g., anodized and/or painted or powder coated or resin coated) to resist corrosion and to maintain good aesthetics.

Alternatively, the hanger assembly 200 may be fabricated using plastic by any suitable plastic forming technique. For example, the hanger assembly 200 may be comprised of a plastic or polymeric material, such as polyvinyl chloride (PVC), nylon, polysulfone, polyethylene, polypropylene, polystyrene, acrylics, cellulosics, acrylonitrile-butadiene-styrene (ABS) terpolymers, urethanes, thermo-plastic resins, thermo-plastic elastomers (TPE), acetal resins, polyamides, polycarbonates and/or polyesters. Other suitable polymeric compositions are known to those familiar with the art and may also be used in accordance with the present invention. Preferably the chosen material is relatively inexpensive, produces a rigid, durable and strong product, is easy to use in manufacturing operations and results in an aesthetically acceptable product.

The material may further include additives to provide desired properties such as desired colors, structural characteristics, glow-in-the dark properties and thermal reactivity (e.g., color changes according to heat). Illustratively, phosphorescent polymer additives, such as aluminate based phosphors, may be added to adsorb light energy and continue to release that energy as visible light, after the energy source is removed. Advantageously, such an embodiment provides a glow-in-the-dark holder that is easy to locate at night.

The hanger assembly 200 may be produced using any suitable manufacturing techniques known in the art for the chosen material, such as (for example) injection, compression, rotary, structural foam, blow, or transfer molding; polyurethane foam processing techniques; vacuum forming; casting; milling; and extrusion. Preferably the manufacturing technique is suitable for mass production at relatively low cost per unit, and results in an aesthetically acceptable product with a consistent acceptable quality and structural characteristics.

Structural reinforcements, such as ribs, corrugations and gussets may be added to components of the assembly to enhance structural integrity. Such structural reinforcements reduce material costs by reducing the volume of material required for a component without compromising structural properties.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A hanger assembly for a bucket, the hanger assembly comprising:
   a top subassembly and a bottom subassembly;
   the top subassembly comprising a mast and at least one arm extending radially from the mast;
   the bottom subassembly comprising a bucket engaging structure and a shaft, the shaft extending upwardly from the bucket engaging structure, and the mast of the top subassembly being coupled to the shaft; and
   the bucket engaging structure of the bottom subassembly comprising a plate, a tail and a pair of legs, the plate including a first end and an opposite second end, the pair of legs including a first leg and a second leg, the first leg extending downwardly from about the first end of the plate, the second leg extending downwardly from about the second end of the plate, the tail extending downwardly between the first leg and the second leg, and the tail being tapered; and
   the shaft of the bottom subassembly extending upwardly from the plate above the tail, each of the first leg and the second leg having a free end, and a first foot attached to the first leg and extending laterally from the free end of the first leg, and a second foot attached to the second leg and extending laterally from the free end of the second leg; and
   each of the first leg and the second leg having a free end, and a first foot attached to the first leg and extending laterally from the free end of the first leg, and a second foot attached to the second leg and extending laterally from the free end of the second leg.

2. The hanger assembly of claim 1, the mast of the top subassembly being rotatably coupled to the shaft of the bottom subassembly.

3. The hanger assembly of claim 2, the mast including a bottom portion comprising a sleeve, and the shaft of the bottom subassembly being received in the sleeve.

4. The hanger assembly of claim 1, the at least one arm comprising an upper arm and a lower arm, each of the upper arm and lower arm extending radially from the mast, and the upper arm and lower arm being spaced apart.

5. The hanger assembly of claim 1,
   the first foot extending inwardly from the free end of the first leg, and the second foot extending inwardly from the free end of the second leg.

6. The hanger assembly of claim 5,
   the first foot having a semicircular cross-section shape, and the second foot having a semicircular cross-section shape.

7. The hanger assembly of claim 5, each of the first leg and the second leg having a free end, and a first groove formed in the first leg adjacent to the free end of the first leg, and a second groove formed in the second leg adjacent to the free end of the second leg.

8. The hanger assembly of claim 7, further comprising a continuous elastic band, the elastic band having a first portion and a second portion, the first portion of the continuous elastic band received in the first groove, and the second portion of the continuous elastic band received in the second groove.

9. The hanger assembly of claim 1, the bucket engaging structure of the bottom subassembly further comprising a ring.

10. The hanger assembly of claim 1, the bucket engaging structure of the bottom subassembly further comprising a disc.

11. A hanger assembly installed on a bucket,
    the bucket comprising an open-top container with a sidewall and a bottom, and the sidewall having an inner side, an outer side and a top edge;
    the hanger assembly comprising:
      a top subassembly and a bottom subassembly;
      the top subassembly comprising a mast and at least one arm extending radially from the mast;
      the bottom subassembly comprising a bucket engaging structure and a shaft, the shaft extending upwardly from the bucket engaging structure, and the mast of the top subassembly being coupled to shaft; and
      the bucket engaging structure of the bottom subassembly comprising a plate, a tail and a pair of legs, the plate including a first end and an opposite second end, the pair of legs including a first leg and a second leg, the first leg extending downwardly from about the first end of the plate, the second leg extending downwardly from about the second end of the plate, the tail extending downwardly between the first leg and the second leg, and the tail being tapered; and
      the shaft of the bottom subassembly extending upwardly from the plate above the tail, each of the first leg and the second leg having a free end, and a first foot attached to the first leg and extending laterally from the free end of the first leg, and a second foot attached to the second leg and extending laterally from the free end of the second leg; and
    each of the first leg and the second leg having a free end, and a first foot attached to the first leg and extending laterally from the free end of the first leg, and a second foot attached to the second leg and extending laterally from the free end of the second leg.

12. The hanger assembly installed on a bucket of claim 11, the mast of the top subassembly being rotatably coupled to the shaft of the bottom subassembly.

13. The hanger assembly installed on a bucket of claim 12, the mast including a bottom portion comprising a sleeve, and the shaft of the bottom subassembly being received in the sleeve.

14. The hanger assembly installed on a bucket of claim 11, the at least one arm comprising an upper arm and a lower arm, each of the upper arm and lower arm extending radially from the mast, and the upper arm and lower arm being spaced apart.

15. The hanger assembly installed on a bucket of claim 11, the first foot extending inwardly from the free end of the first leg, and the second foot extending inwardly from the free end of the second leg.

16. The hanger assembly installed on a bucket of claim 15,
    the first foot having a semicircular cross-section shape, and the second foot having a semicircular cross-section shape.

17. The hanger assembly installed on a bucket of claim 11, each of the first leg and the second leg having a free end, and a first groove formed in the first leg adjacent to the free end of the first leg, and a second groove formed in the second leg adjacent to the free end of the second leg.

18. The hanger assembly installed on a bucket of claim 17, further comprising a continuous elastic band, the elastic band having a first portion and a second portion, the first portion of the continuous elastic band received in the first groove, and the second portion of the continuous elastic band received in the second groove.

19. The hanger assembly installed on a bucket of claim 11, the bucket engaging structure of the bottom subassembly further comprising a ring sized and shaped to fit in the bottom of the bucket.

20. The hanger assembly installed on a bucket of claim 11, the bucket engaging structure of the bottom subassembly further comprising a disc sized and shaped to fit in the bottom of the bucket.

* * * * *